United States Patent [19]

Takashima

[11] Patent Number: 4,643,522

[45] Date of Patent: Feb. 17, 1987

[54] OPTICAL PICKUP HAVING A DRIVING UNIT FOR MOVING OBJECTIVE LENS

[75] Inventor: Mitsuru Takashima, Tokyo, Japan

[73] Assignee: Sony Corporation, Tokyo, Japan

[21] Appl. No.: 635,607

[22] Filed: Jul. 30, 1984

[51] Int. Cl.[4] ............................ G02B 7/04; G11B 7/12
[52] U.S. Cl. ........................................ 350/255; 369/45
[58] Field of Search ............... 350/255, 247; 360/77, 360/78, 86, 114, 115, 119, 120, 130.32; 369/44, 45

[56] References Cited

U.S. PATENT DOCUMENTS

| | | | |
|---|---|---|---|
| 4,462,096 | 7/1984 | Kusaka | 369/45 |
| 4,467,463 | 8/1984 | Yano | 350/255 |
| 4,472,024 | 9/1984 | Kononura et al. | 350/247 |
| 4,473,274 | 9/1984 | Yano et al. | 350/255 |
| 4,507,764 | 3/1985 | Musha | 350/247 |

*Primary Examiner*—John K. Corbin
*Assistant Examiner*—Loha Ben
*Attorney, Agent, or Firm*—Hill, Van Santen, Steadman & Simpson

[57] ABSTRACT

An optical pickup has a driving unit for driving a driven member which has an objective lens. The driving unit has an open loop arrangement of a pair of magnets, the same poles of which oppose each other.

10 Claims, 27 Drawing Figures

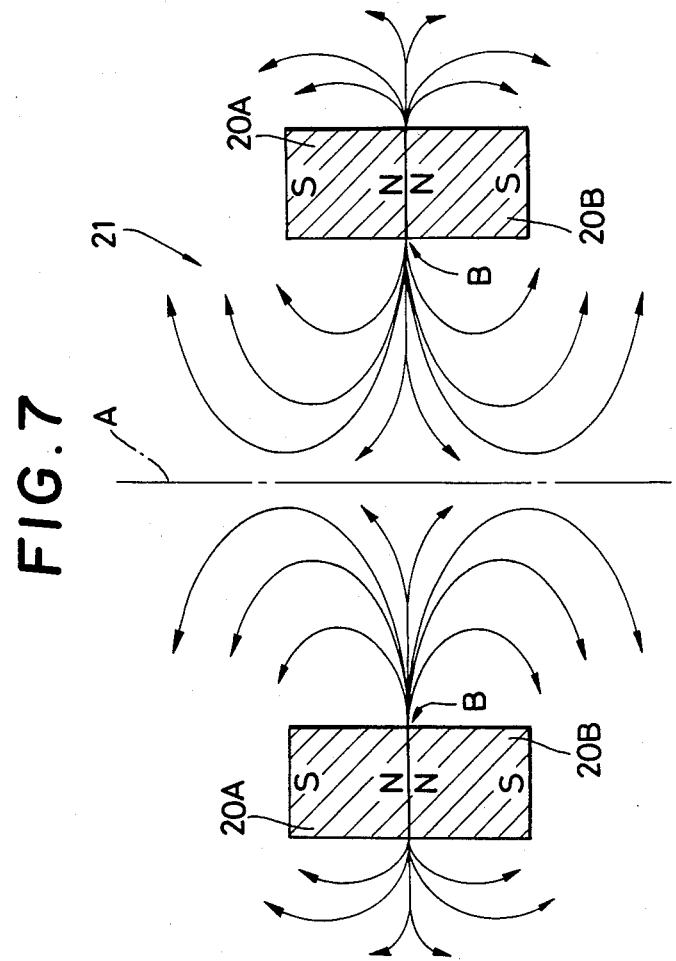

FIG. 12A
FIG. 12
| FIG. 12A |
| FIG. 12B |
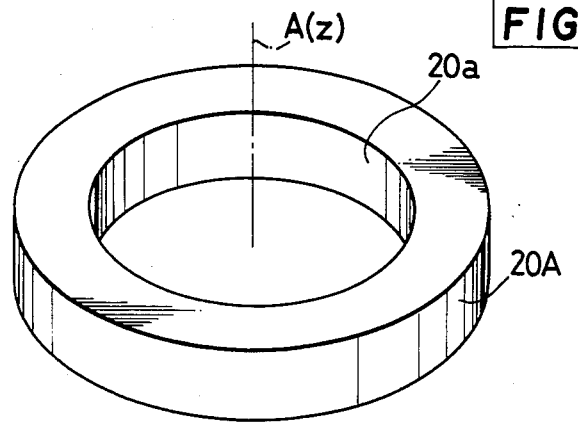
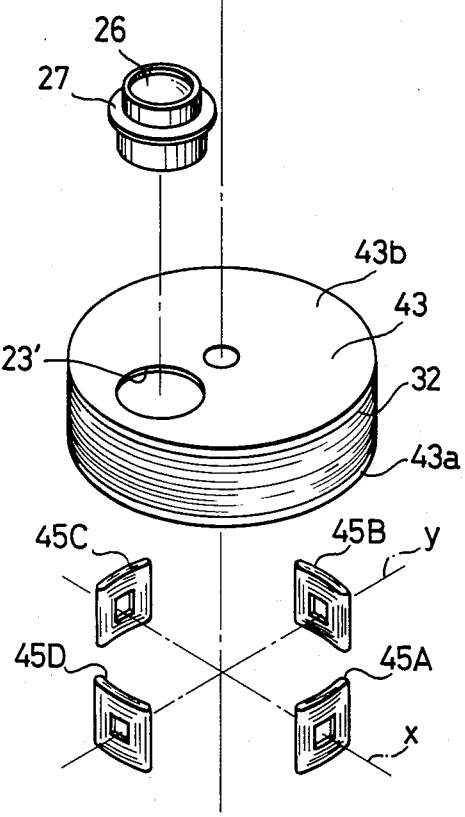

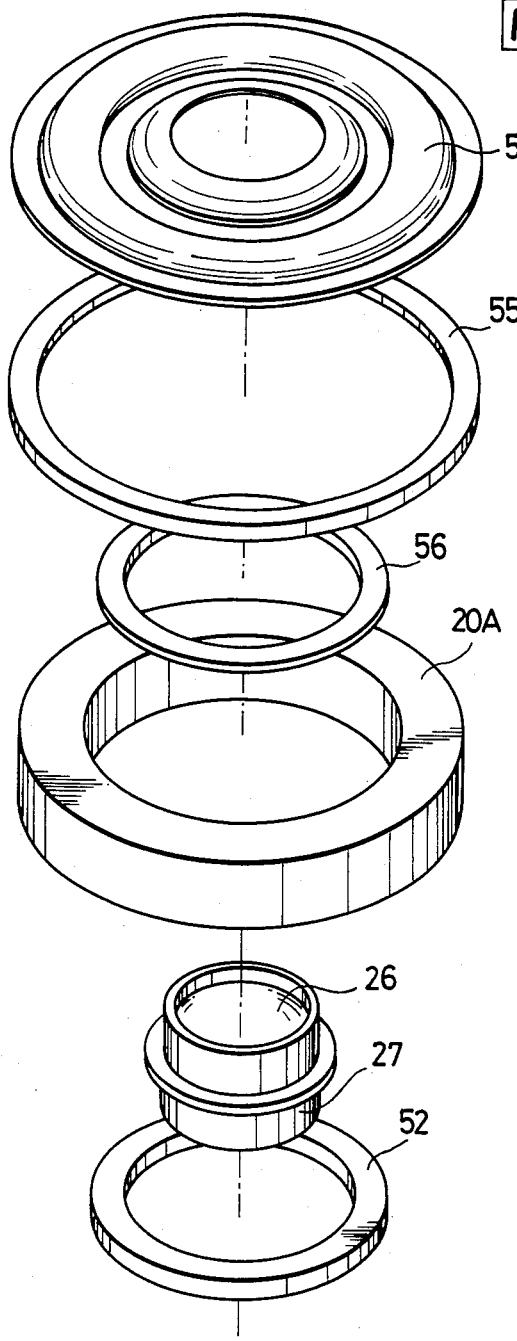

OPTICAL PICKUP HAVING A DRIVING UNIT FOR MOVING OBJECTIVE LENS

BACKGROUND OF THE INVENTION

1. Field of the Invention:

The present invention relates to an optical pickup having a driving unit for driving a driven member having an objective lens by a magnetic force.

2. Description of the Prior Art:

A conventional optical pickup shown in FIGS. 1 to 3 is known as an optical pickup of this type.

A bearing 2 is fitted through along an axis of a cylindrical objective lens holder 1 and is held therein. The bearing 2 is fitted around a support shaft 4, and the lower end of the support shaft 4 is fixed on a disk-like base 3 made of a soft magnetic material.

An objective lens 6 is held in the objective lens holder 1 at a position spaced apart from an axis of the support shaft 4 of the objective lens holder 1 through a lens frame 5 in such a manner that an optical axis of the objective lens 6 is substantially parallel to the axis of the support shaft 4.

A focus coil 7 is wound around a wall 1a of the objective lens holder 1 so as to linearly drive the objective lens holder 1 toward an in-focus position. Four tracking coils 8A to 8D are adhered to the outer surface of the focus coil 7 in an overlapping manner so as to rotatably drive the objective lens 6 in the tracking direction. The tracking coils 8A to 8D have a rectangular shape and are adhered to the focus coil 7 on the objective lens holder 1 at equal angular intervals.

A pair of inner yokes 3b and 3c are formed integrally on an upper surface 3a of the base 3 at the central portion of the base 3 so as to oppose each other through the support shaft 4. A magnetic ring 9 and a pair of outer yokes 10a and 10b in contact with the magnetic ring 9 are mounted on the base 3 so as to surround the inner yokes 3b and 3c. More specifically, the outer yokes 10a and 10b are formed integrally with each other and oppose the inner yokes 3b and 3c through the wall 1a of the objective lens holder 1.

A magnetic flux is formed perpendicular to the wall 1a of the objective lens holder 1 in a space between the inner yokes 3b and 3c and the outer yokes 10a and 10b. A drive current flows through the focus coil 7 to linearly drive the objective lens holder 1 along the axis of the support shaft 4 which corresponds to the focusing direction. A drive current flows through the tracking coils 8A to 8D to rotate the objective lens holder 1 around the shaft 4 along the tracking direction.

A rubber damper member 11 serves as a neutral position holding mechanism for tracking the objective lens holder 1. Reference numeral 12 denotes a connecting pin.

In the optical pickup having the construction described above, the space between the inner yokes 3b and 3c and the outer yokes 10a and 10b serves as a space for generating a magnetic field for driving the objective lens 6. Even if a magnetic field of high magnetic flux density is obtained to effectively drive the objective lens 6 with a small drive current, the optical pickup has a closed loop mechanism requiring the inner yokes 3b and 3c and the outer yokes 10a and 10b. Therefore, the optical pickup must have a large size due to the inclusion of the yokes 3b, 3c, 10a and 10b. In addition to this disadvantage, manufacture of the yokes 3b, 3c, 10a and 10b results in a high cost and a complicated assembly.

SUMMARY OF THE INVENTION

It is an object of the present invention to provide an optical pickup having a driving unit wherein a high magnetic flux density field can be obtained even with a compact construction and easy assembly at low cost, and a driven member having an objective lens can be effectively driven.

It is another object of the present invention to provide an optical pickup having a driving unit wherein a driven member having an objective lens can be effectively driven along any one of the orthogonal three axes.

It is still another object of the present invention to provide an optical pickup having a driving unit wherein a driven member having an objective lens can be effectively driven while pivotal movement thereof is prevented.

It is still another object of the present invention to provide an optical pickup having a driving unit wherein a driven member having an objective lens can be effectively driven at a high response speed.

It is still another object of the present invention to provide an optical pickup having a driving unit wherein a driven member having an objective lens can be driven effectively and smoothly.

It is still another object of the present invention to provide an optical pickup having a driving unit wherein a driven member having an objective lens can be linearly or pivotally driven with high efficiency.

BRIEF DESCRIPTION OF THE DRAWINGS

FIGS. 1 to 3 show a conventional optical pickup, in which

FIG. 1 is an exploded perspective view thereof,

FIG. 2 is a perspective view thereof, and

FIG. 3 is a longitudinal sectional view thereof;

FIGS. 4 to 23 show optical pickups according to embodiments of the present invention, in which FIGS. 4 to 7 are respectively an exploded perspective view, a longitudinal sectional view and a plan view of an optical pickup according to a first embodiment and a representation for explaining the magnetic field thereof, FIGS. 8 to 10 are respectively an exploded perspective view, a longitudinal sectional view and a partially cutaway plan view of an optical pickup according to a second embodiment of the present invention, FIG. 11 is a longitudinal sectional view of an optical pickup according to a third embodiment of the present invention, FIGS. 12 to 14 are respectively an exploded perspective view and a longitudinal sectional view of an optical pickup according to a fourth embodiment of the present invention and a representation for explaining the magnetic flux density distribution pattern thereof, FIG. 15 is a longitudinal sectional view of an optical pickup according to a fifth embodiment of the present invention, FIGS. 16 to 18 are respectively a longitudinal sectional view and a plan view of an optical pickup according to a sixth embodiment of the present invention and a representation for explaining the magnetic flux density distribution pattern thereof, FIGS. 19 and 20 are respectively a longitudinal sectional view of an optical pickup according to a seventh embodiment of the present invention and a representation for explaining the magnetic flux density distribution pattern thereof, FIG. 21 is a longitudinal sectional view of an optical pickup according to an eighth embodiment of the present invention, and FIGS. 22 and 23 are respectively an exploded perspective view and a longitudinal sectional view of an optical pickup according to a ninth embodiment of the present invention.

DETAILED DESCRIPTION OF THE PREFERRED EMBODIMENTS

Optical pickups according to first to ninth embodiments of the present invention will be described with reference to the accompanying drawings.

First Embodiment (FIGS. 4 to 7)

Figure 1:
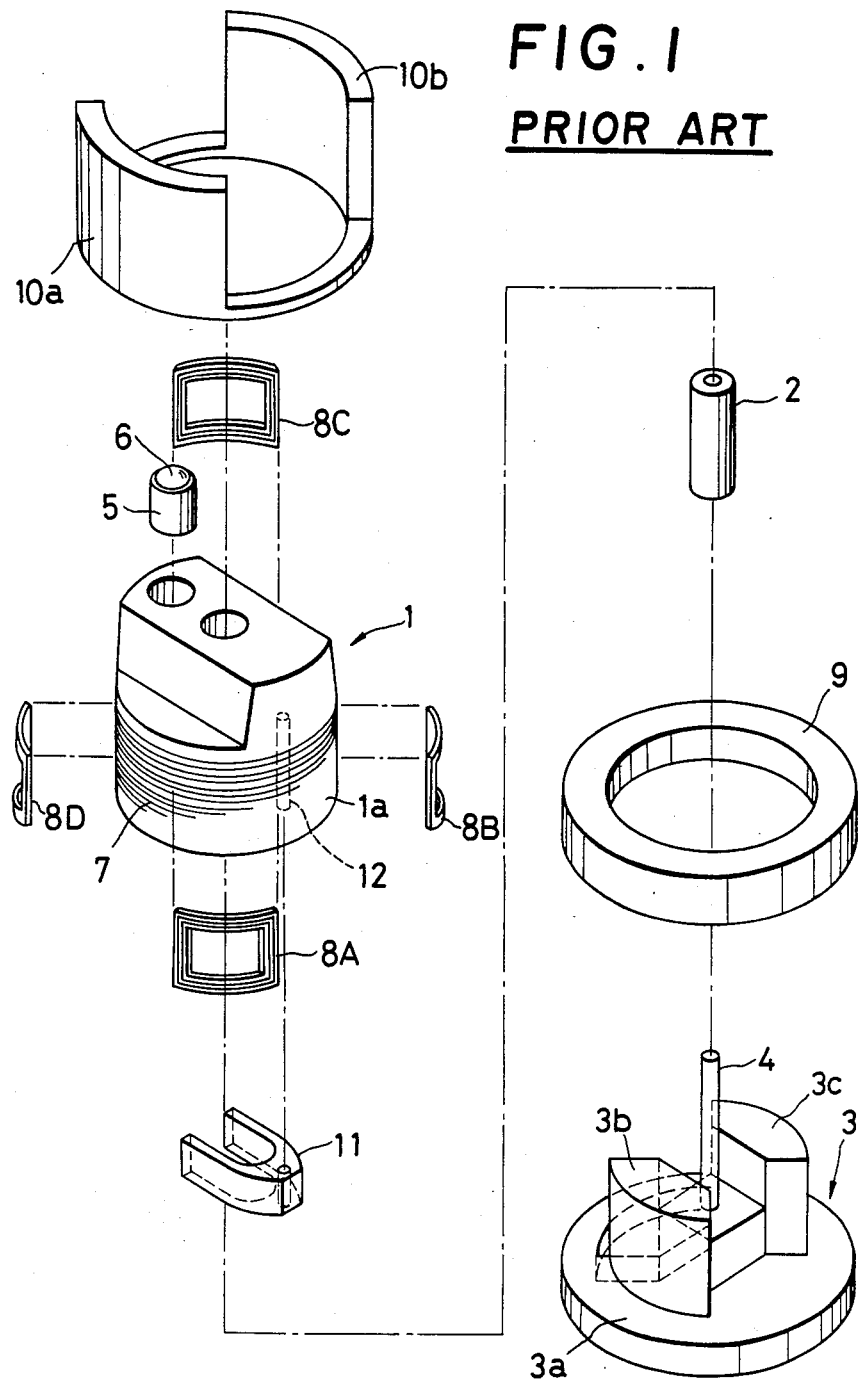
Figure 2:
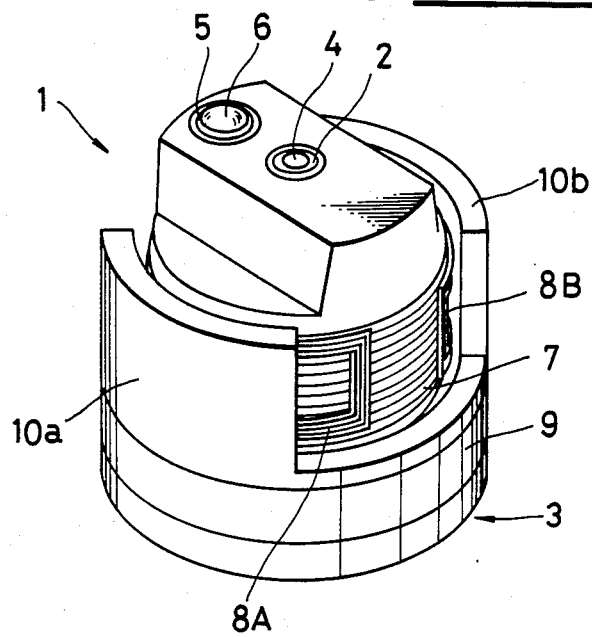
Figure 3:
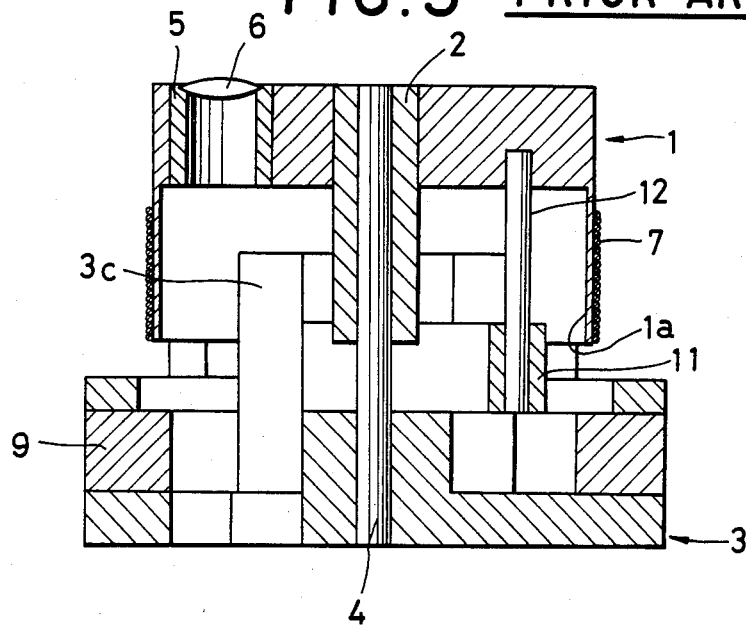
Figure 4:
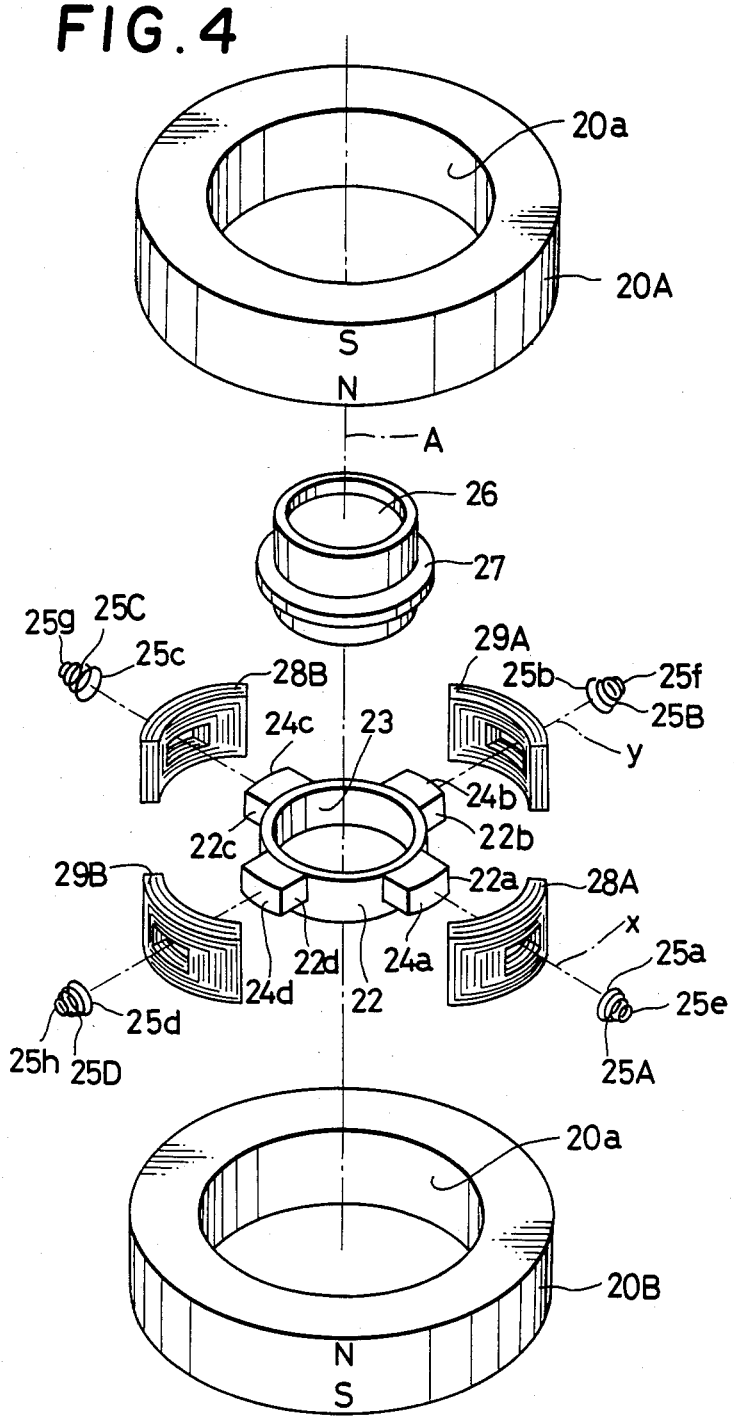
Figure 5:
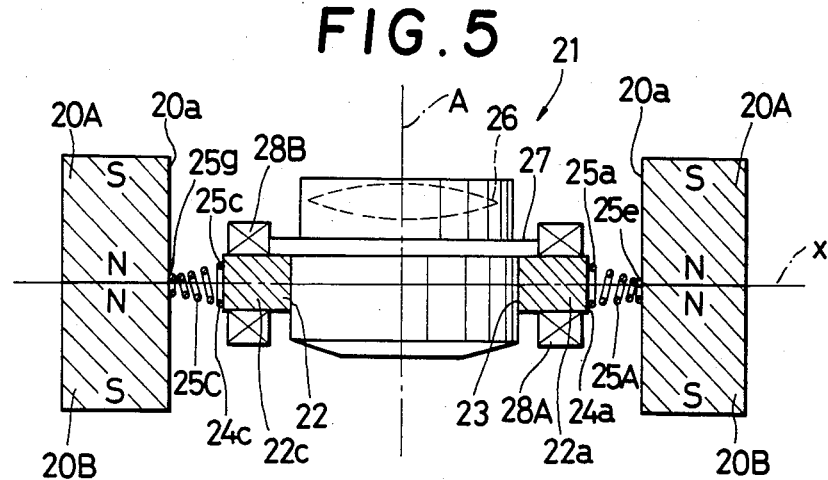
Figure 6:
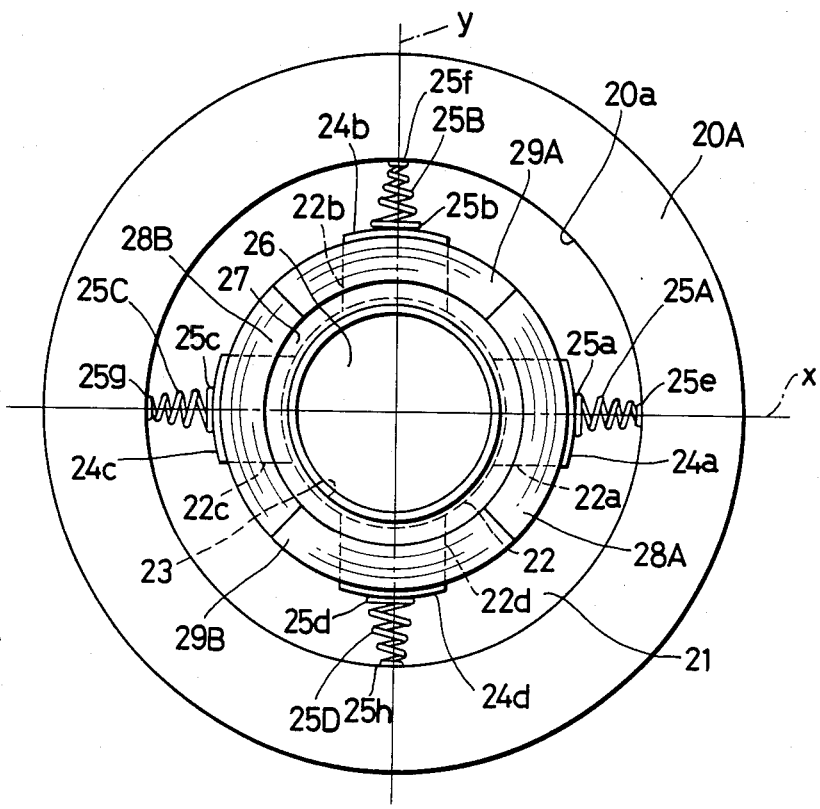

A pair of cylindrical magnets 20A and 20B having an identical size are brought into contact and vertically aligned with each other with respect to an axis A, as shown in FIGS. 5 and 7. The N and S poles of the magnets 20A and 20B are directed along an axial direction (i.e., the same direction as the axis A). The same poles (N poles shown in FIG. 5) of each magnet oppose each other.

For this reason, the magnetic fluxes from the N poles of the pair of magnets 20A and 20B are dispersed from boundary position B as shown in FIG. 7. The magnetic fluxes are dispersed toward the axis (horizontally) in a space 21 defined by the pair of magnets 20A and 20B along a plane perpendicular to the axis A. Therefore, a magnetic field of high magnetic flux density along the plane perpendicular to the axis A is formed in the vicinity of the boundary positions B in the space 21, i.e., in the vicinity of the N poles of the pair of magnets 20A and 20B.

An objective lens holder 22 made of a soft magnetic material is disposed in the vicinity of the boundary positions B in the space 21. The objective lens holder 22 comprises a ring with a circular through hole 23 extending along the axis A. The circular through hole 23 is formed at the central portion of the objective lens holder 22. Four projections 22a to 22d are formed integrally on the outer surface of the objective lens holder 22 along the x-axis perpendicular to the axis A and the y-axis perpendicular to the x-axis and the axis A. The four projections 22a to 22d are formed at equal intervals on the outer surface of the objective lens holder 22. It should be noted that the x-axis in the optical pickup corresponds to the tracking direction of tracks concentrically or spirally formed on an optical disk, that the y-axis corresponds to the tangential direction thereto, and that the axis A corresponds to the focusing direction.

Conical coil springs 25A and 25C are mounted on the projections 22a and 22c between distal ends 24a and 24c of the projections 22a and 22c and the pair of magnets 20A and 20B along the x-axis such that large-diameter portions 25a and 25c of the coil springs 25A and 25C are directed toward the distal ends 24a and 24c. Similarly, conical coil springs 25B and 25D are mounted on the projections 22b and 22d between distal ends 24b and 24d of the projections 22b and 22d and the pair of magnets 20A and 20B along the y-axis such that large-diameter portions 25b and 25d of the coil springs 25B and 25D are directed toward the distal ends 24a and 24c. One end of each of the large-diameter portions 25a to 25d of the coil springs 25A to 25D is fixed at a corresponding one of the distal ends 24a to 24d, and one end of each of small-diameter portions 25e to 25h is fixed at the inner surfaces 20a of the pair of magnets 20A and 20B. A lens frame 27 having an objective lens 26 is inserted in the through hole 23 in such a manner that an optical axis of the objective lens 26 matches with the axis A.

The objective lens holder 22 is movably supported by the coil springs 25A to 25D along the x- and y-axes.

Coils 28A and 28B for linearly driving the objective lens holder 22 along the x-axis are respectively mounted on the pair of projections 22a and 22c extending along the x-axis. Each of the coils 28A and 28B is wound in one direction with respect to the x-axis as its axis. Similarly, coils 29A and 29B for driving the objective lens holder 22 along the y-axis are respectively mounted on the pair of projections 22b and 22d extending along the y-axis. Each of the coils 29A and 29B is wound in one direction with respect to the y-axis as its axis.

These coils 28A, 28B, 29A and 29B and the projections 22a to 22d of the objective lens holder 22 are located in the magnetic field of high magnetic flux density Therefore, a drive current flows through the coils 28A, 28B, 29A and 29B to magnetize the projections 22a to 22d. When attraction/repulsion of the N poles of the pair of magnets 20A and 20B is utilized to drive the objective lens holder 22, only a small current is required. Effective driving decreases the number of turns of the coils 28A, 28B, 29A and 29B, thereby improving driving efficiency and reducing the requirement to a small, light-weight driving unit. The small, light-weight driving unit improves the response characteristics, and the optical pickup having this driving unit can be stably operated even if disturbance occurs.

An open loop magnetic circuit using the pair of magnets 20A and 20B can produce a magnetic field of high magnetic flux density, unlike a closed loop circuit having yokes. Therefore, the optical pickup can be made small at low cost and can allow easy assembly.

The objective lens holder 22 may be made of a nonmagnetic material. In this case, the drive current flowing through the coils 28A, 28B, 29A and 29B constitute virtual magnetic poles. The attraction/repulsion between these virtual magnetic poles and the N poles of the pair of magnets 20A and 20B drives the objective lens holder 22. In this case, all other arrangements are the same as that in the first embodiment.

Other embodiments will be described with reference to the accompanying drawings. The reference numerals used in the following embodiments denote the same parts as in the first embodiment. In addition, the description made with reference to the first embodiment will be omitted.

Figure 8A:
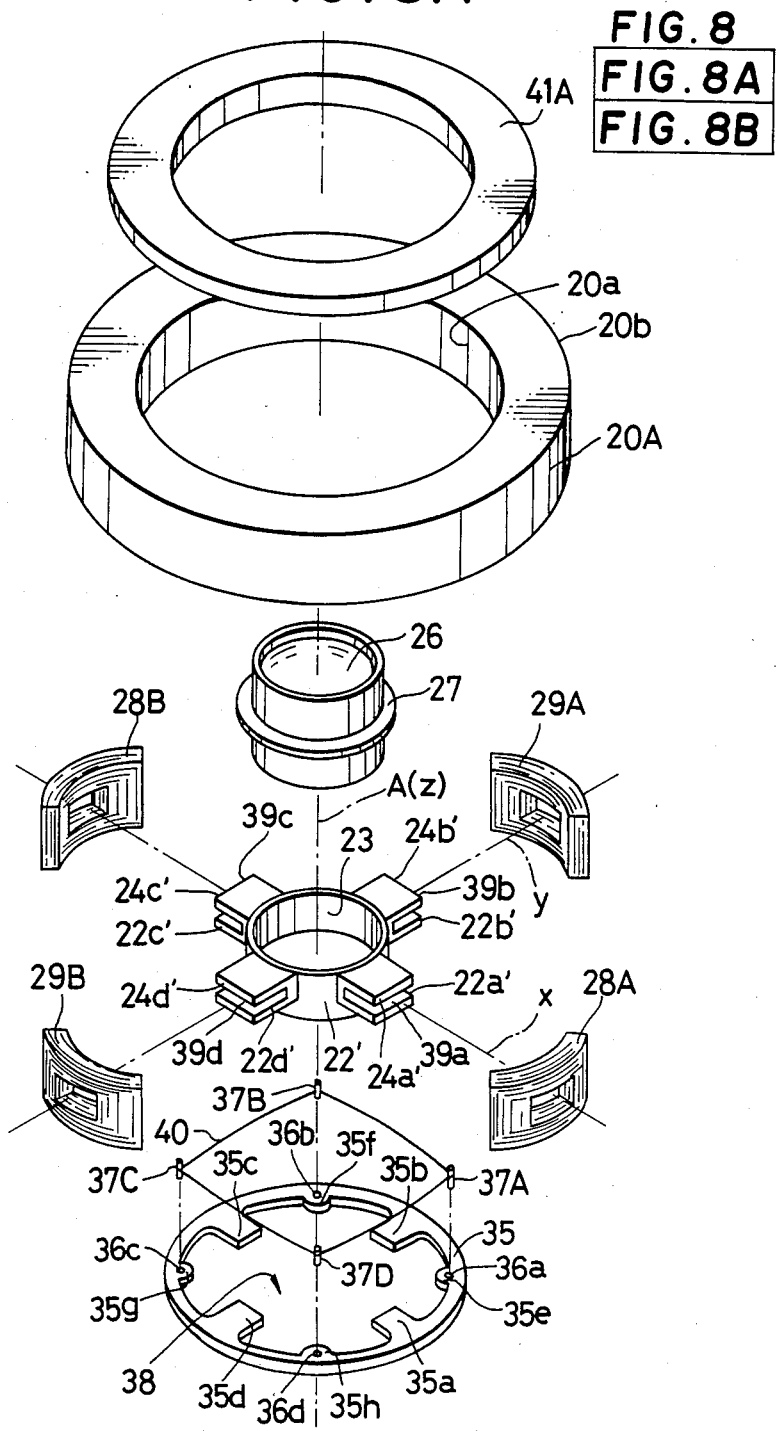
Figure 8B:
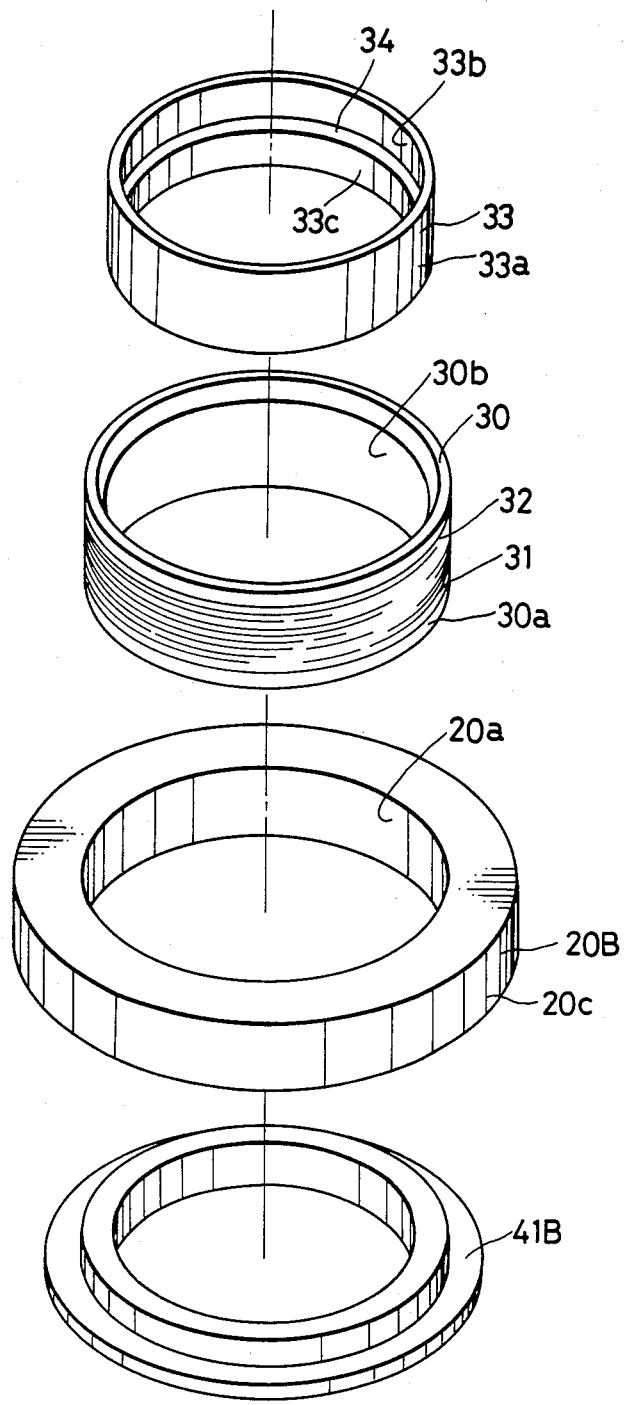
Figure 9:
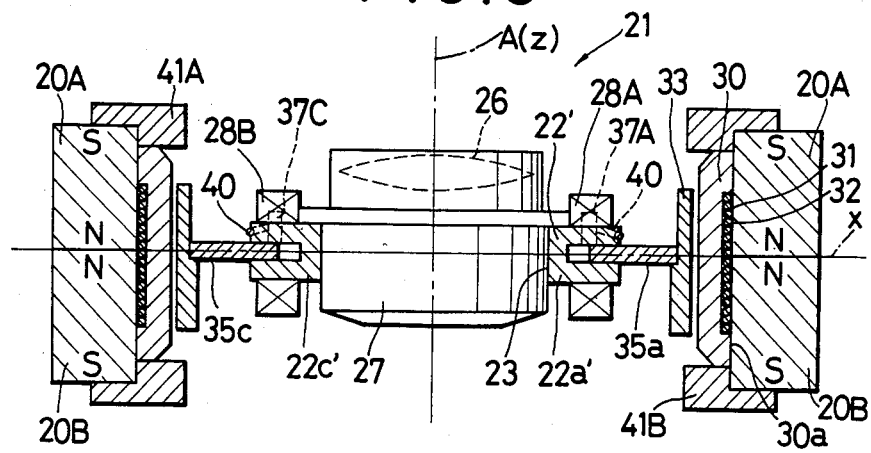
Figure 10:
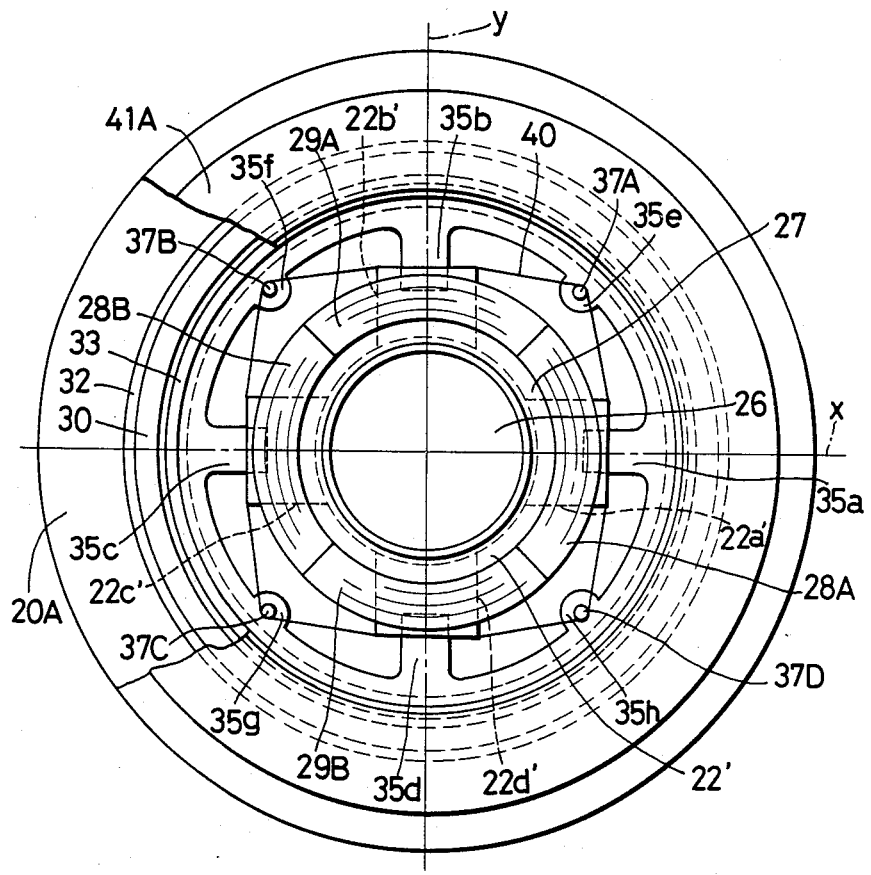

Second Embodiment (FIGS. 8 to 10)

A nonmagnetic fixing cylinder 30 is fitted coaxially with inner surfaces 20a of a pair of magnets 20A and 20B which define a space 21. A wide groove 31 is formed in an entire outer surface 30a of the fixing cylinder 30. A coil 32 is wound in the groove 31 of the outer surface 30a to drive an objective lens 26 in the optical pickup along a focusing direction for an optical disk (i.e., along the z-axis corresponding to an axis A).

A nonmagnetic movable cylinder 33 is coaxially fitted in the fixing cylinder 30 such that the outer peripheral surface of the cylinder 33 is in contact with an inner surface 30b of the fixing cylinder 30. The movable cylinder 33 is fitted in the fixing cylinder 30 to be slidable along the axis A (z-axis). A solid lubricant such as Teflon is coated on the inner surface 30b of the fixing cylinder 30 and an outer surface 33a of the movable cylinder 33.

On the other hand, a step 34 is formed on an inner peripheral surface 33b of the movable cylinder 33 so as to decrease an inner diameter of a lower portion 33c. A flat ring 35 made of a soft magnetic material is placed on the step 34 and is fixed thereat.

Rectangular supports 35a and 35c and rectangular supports 35b and 35d extend inward from the ring 35 toward the axis A along the x- and y-axes, respectively. The four supports 35a to 35d are formed at equal angular intervals. Each of projections 35e to 35h is formed integrally with the ring 35 between the corresponding two adjacent supports of the supports 35a to 35d. Lower ends of damper pins 37A to 37D are tightly inserted in holes 36a to 36d formed at the centers of the projections 35e to 35h.

A nonmagnetic ring-like objective lens holder 22' is disposed in a central hole 38 of the ring 35. In the same manner as in the first embodiment, the outer peripheral portion of the objective lens holder 22' has four projections; projections 22a' and 22c' along the x-axis and projections 22b' and 22d' along the y-axis. The projections 22a' to 22d' have fitting slits 39a to 39d corresponding to the supports 35a to 35d, respectively.

The fitting slits 39a to 39d have openings at distal ends 24a' to 24d' of the projections 22a' to 22d', and are loosely fitted with the supports 35a to 35d so as to slidably move the objective lens holder 22' with respect to the supports 35a and 35c along the x-axis and the supports 35b and 35d along the y-axis. Therefore, the objective lens holder 22' is supported by the ring 35 to be movable along the x- and y-axes.

A solid lubricant such as Teflon is coated on the outer surfaces of the supports 35a to 35d of the ring 35 and the inner surfaces of the fitting slits 39a to 39d of the projections 22a' to 22d'. Coils 28A, 28B, 29A and 29B are wound around the projections 22a' to 22d' in the same manner as in the first embodiment.

A ring-like string damper 40 is looped around the distal ends 24a' to 24d' of the projections 22a' to 22d' and the damper pins 37A to 37D. The distal ends 24a' to 24d' of the projections 22a' to 22d' are elastically biased by the string damper 40 toward the axis A so as to hold the objective lens holder 22' at a neutral position within the x-y plane.

Upper and lower stopper rings 41A and 41B are respectively fitted on an upper portion 20b of the magnet 20A and a lower portion 20c of the magnet 20B so as to fix the fixing cylinder 30 and prevent the movable cylinder 33 from being removed.

The coils 28A, 28B, 29A, 29B and 32 and at least the supports 35a to 35d of the ring 35 are located within the magnetic field of high magnetic flux density.

When a drive current flows in a coil 32, the magnetic field of high magnetic flux density is moved along the axis A and the objective lens holder 22' is driven along the axis A (z-axis). Upon displacement of the magnetic field of high magnetic flux density, the magnetic fluxes transmitted through the supports 35a to 35d of the ring 35 are displaced, so that the ring 35 is moved by the displacement of the magnetic fluxes. As a result, the objective lens holder 22' is moved along the axis A.

When the magnetic field of high magnetic flux density is displaced, the coils 28A, 28B, 29A and 29B and the like are also displaced. Therefore, the objective lens holder 22' can be driven without any adverse effect on its movement along the x- and y-axes due to attraction/repulsion between the virtual poles of the coils 28A, 28B, 29A and 29B and the supports 35a to 35d of the ring 35 magnetized by the pair of magnets 20A and 20B.

The objective lens holder 22' is held at the neutral position along the axis A (z-axis) by attraction between the supports 35a to 35d of the magnetized ring 35 and the N poles of the pair of magnets 20A and 20B.

In this manner, the objective lens holder 22' can be effectively driven along the x-, y- and z-axes.

In addition, since the magnetic field of high magnetic flux density for driving the objective lens holder 22' along the three axes (i.e., x-, y- and z-axes) can be generated by a single magnetic circuit of the pair of magnets 20A and 20B in an open loop configuration without requiring yokes or the like, a compact, low-cost optical pickup can be obtained. In addition, the assembly operation can be simplified.

The objective lens holder 22' may be made of a soft magnetic material. In this case, attraction/repulsion occurs when the projections 22a' to 22d' of the objective lens holder 22' are magnetized by the coils 28A, 28B, 29A and 29B.

All other arrangements and operations of this embodiment are the same as those in the first embodiment.

Figure 11:
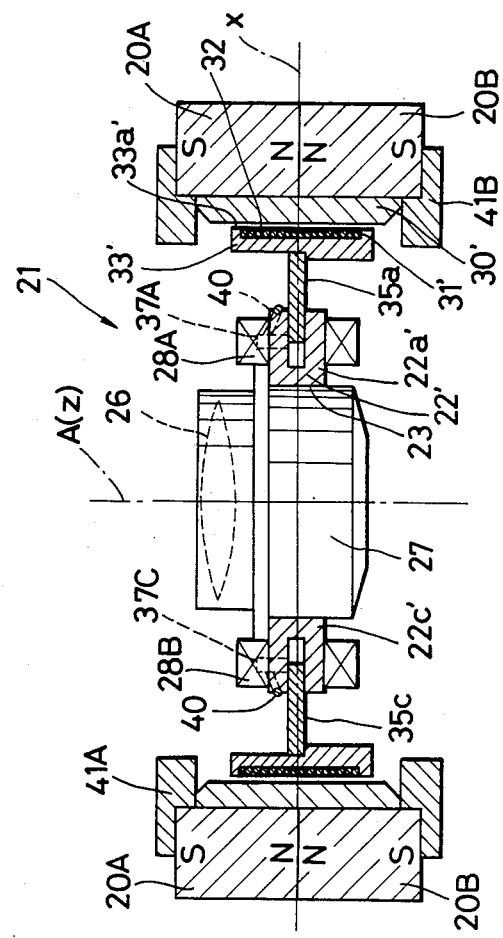

Third Embodiment (FIG. 11)

Unlike in the second embodiment, a groove 31' is formed on an outer peripheral surface 33a' of a movable cylinder 33'. A coil 32' is wound in the groove 31' of the movable cylinder 33'.

When a drive current flows through the coil 32', an electromagnetic force generated by the electromagnetic behavior thereof drives the movable cylinder 33' and an objective lens holder 22' along the axis A. Therefore, an objective lens 26 is driven along the axis A.

All other arrangements and operations of this embodiment are the same as those in the second embodiment.

Figure 12B:
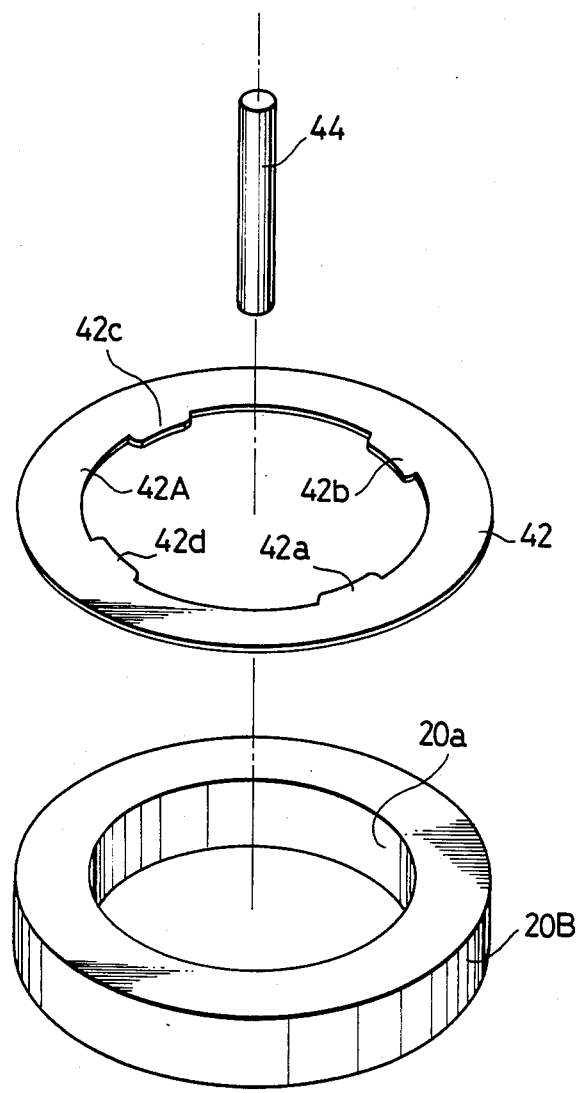
Figure 13:
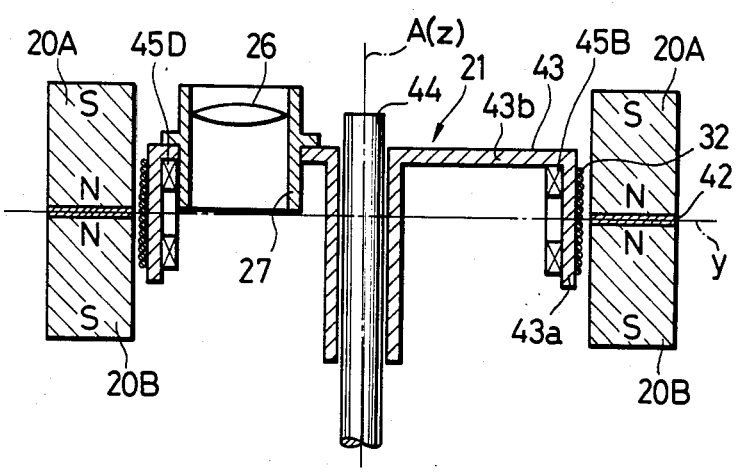
Figure 14:
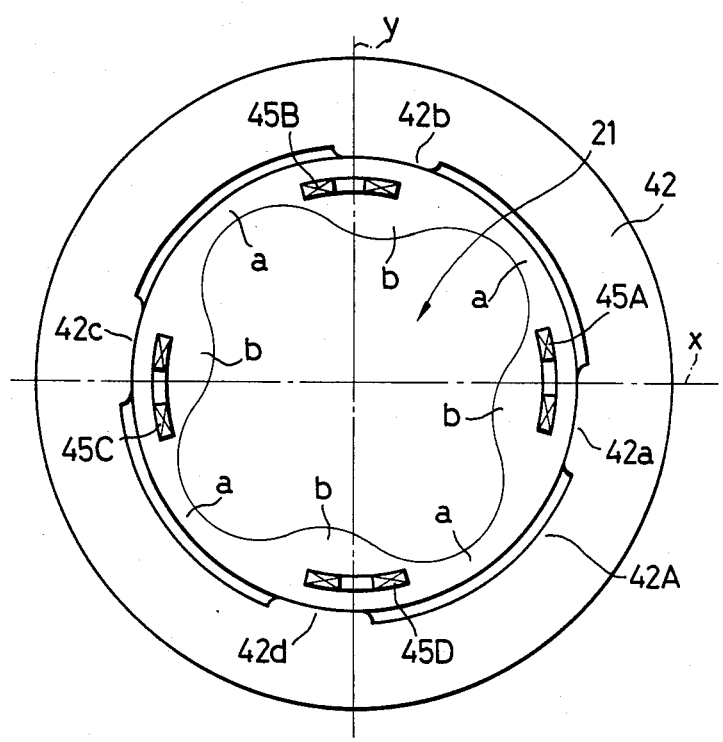

Fourth Embodiment (FIGS. 12 to 14)

A ring-like flat spacer 42 made of a soft magnetic material is inserted between a pair of magnets 20A and 20B. An inner peripheral edge 42A of the spacer 42 has four projections 42a to 42d at equal angular intervals. An irregularity is formed at the inner peripheral edge 42A of the spacer 42 on a plane perpendicular to an axis A. The projections 42a to 42d of the spacer 42 have distal end faces aligned with inner surfaces 20a of the pair of magnets 20A and 20B.

Sparse magnetic flux portions a and dense magnetic flux portions b are alternately formed along the inner peripheral edge 42A of the spacer 42, as shown in FIG. 14.

On the other hand, an objective lens holder 43 is made of a nonmagnetic material and comprises a cylindrical side wall 43a and a disk-like end plate 43b integrally formed therewith. The objective lens holder 43 is disposed in a space 21 defined by the pair of magnets 20A and 20B such that the objective lens holder 43 is coaxial with the axis A.

The objective lens holder 43 is supported around a support shaft 44 matching to be pivotal about an axis A and is also slidably supported along the axis A.

A through hole 23' for holding an objective lens 26 is formed in the end plate 43b of the objective lens holder 43 at a position spaced apart from the support shaft 44. The objective lens 26 is held in the through hole 23' such that the optical axis of the objective lens 26 is parallel to the axis A.

A coil 32 is wound around the outer surface of the objective lens holder 43. Four coils 45A to 45D are adhered to the inner surface of the side wall 43a of the objective lens holder 43 at equal angular intervals so as to pivotally drive the objective lens holder 43 about the axis A.

Each of the coils 45A to 45D comprises a coil obtained by winding a wire in one direction. The coils 45A to 45D are adhered to the outer wall surface of the objective lens holder 43 such that the openings of the coils 45A to 45D extend along the direction perpendicular to the axis A. These coils 45A to 45D correspond to transition points from the dense magnetic flux portions b to the sparse magnetic flux portions a of the magnetic field in a space 21, as shown in FIG. 14 and are located in the vicinity of the dense magnetic flux portions b.

When the drive current flows through the coils 45A to 45D, virtual poles are formed. Therefore, attraction/repulsion between the virtual poles and the dense magnetic flux portions b pivots the objective lens holder 43 about the axis A. A neutral position holding mechanism (not shown) is arranged for the objective lens holder 43 so as to hold the objective lens holder 43 at a neutral position about the support shaft 44.

As described above, the magnetic field having the sparse magnetic flux portions a and the dense magnetic flux portions b in the space 21 is achieved by the spacer 42, and this magnetic flux field can be obtained by an open loop single magnetic circuit of the pair of magnets 20A and 20B. Therefore, without increasing the size and manufacturing cost of the optical pickups, a magnetic field can be obtained to perform linear and pivotal driving.

All other arrangements and operations are the same as those of each of the first to third embodiments.

Figure 15:
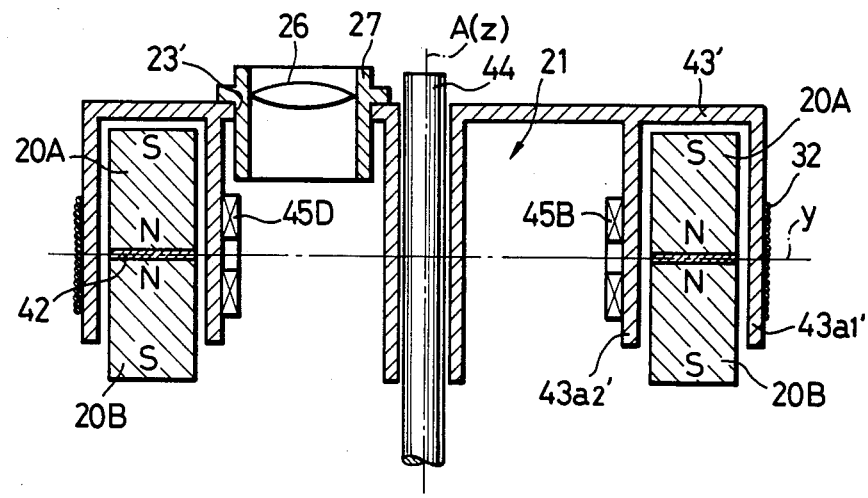

Fifth embodiment (FIG. 15)

In the above-mentioned fourth embodiment, the side wall 43a of the objective lens holder 43 has a single structure. However, an objective lens holder 43' has a double wall structure. A pair of magnets 20A and 20B are inserted between an outer side wall $43_{a1}'$ and an inner side wall $43_{a2}'$.

A coil 32 is wound around the outer surface of the outer wall $43_{a1}'$, and four coils 45A to 45D are adhered to the inner surface of the inner side wall $43_{a2}'$ at equal angular intervals. The coil 32 is located in a magnetic field of high magnetic flux density formed outside the pair of magnets 20A and 20B.

The coils 45A to 45D may be adhered to the outer side wall $43_{a1}'$, and the coil 32 may be mounted on the inner side wall $43_{a2}'$.

Any other arrangement in the fifth embodiment is the same as that of the fifth embodiment, including the fact that the coils 45A to 45D are disposed in the vicinity of dense magnetic flux portions b.

Figure 16:
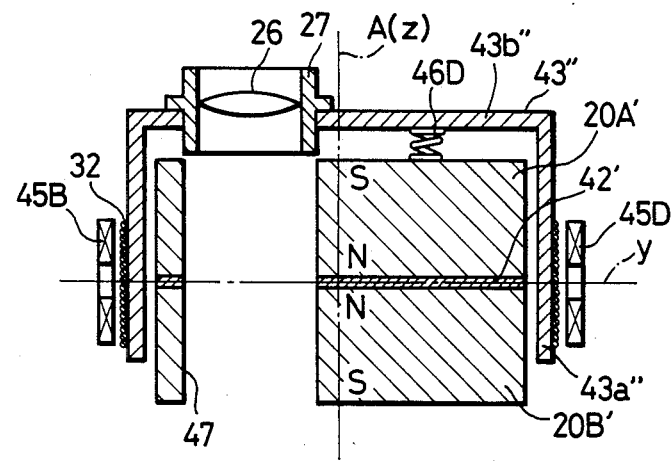
Figure 17:
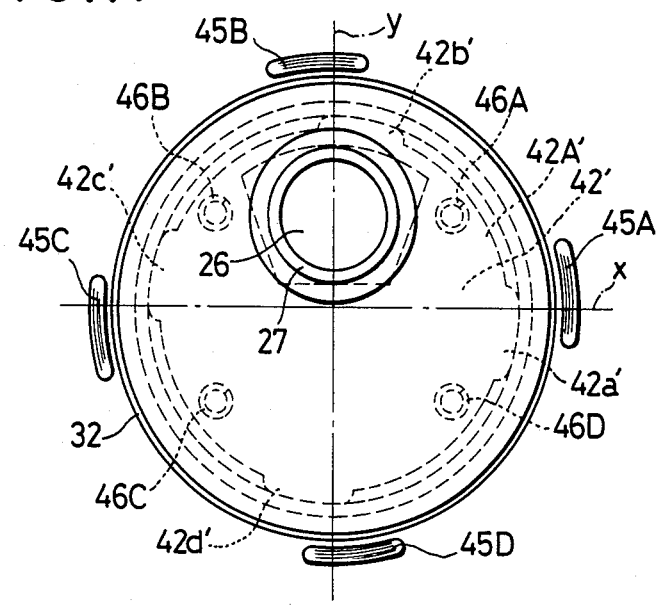
Figure 18:
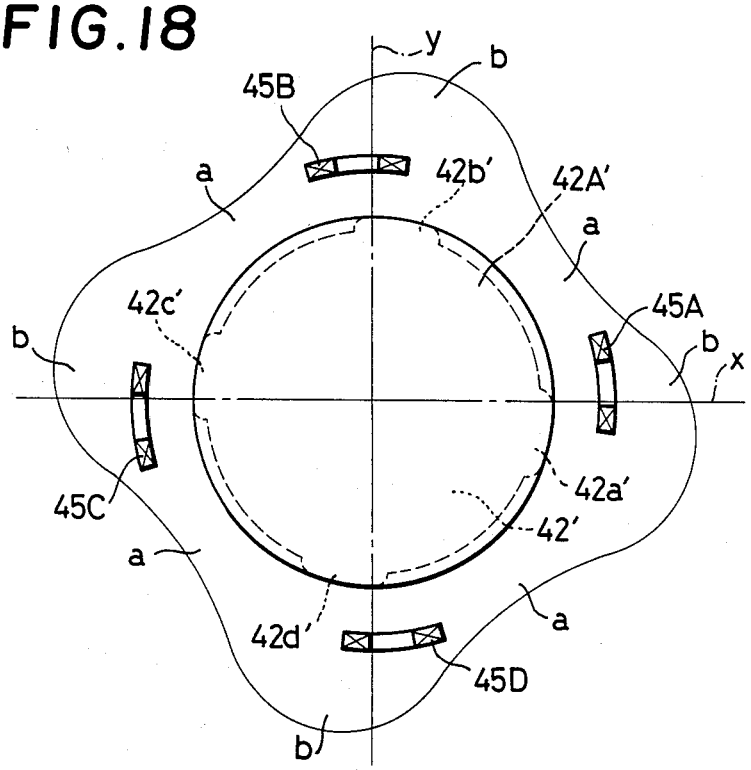

Sixth Embodiment (FIGS. 16 to 18)

A pair of upper and lower columnar magnets 20A' and 20B' having an identical size are vertically aligned on an axis A. The sixth embodiment is the same as each of the first to fifth embodiments in that pairs of magnetic poles of the pair of the magnets 20A' and 20B' are formed along the axis A and that the same poles as in these magnets 20A' and 20B' oppose each other.

A soft magnetic disk-like flat spacer 42' is inserted between the pair of magnets 20A' and 20B'.

A peripheral 42A' of the spacer 42' has four projections 42a' to 42d' extending at equal angular intervals along a direction perpendicular to the axis A, as shown in FIG. 18. The distal end faces of the projections 42a' to 42d' are aligned with the outer surfaces of the pair of magnets 20A' and 20B'.

Sparse magnetic flux portions a and dense magnetic flux portions b in a magnetic field around the magnets 20A' and 20B' are formed along the peripheral edge 42A' of the spacer 42', as shown in FIG. 18.

On the other hand, an objective lens holder 43" comprises a nonmagnetic side wall 43a" and a nonmagnetic end plate 43b" in the same manner as in the fourth embodiment. The objective lens holder 43" is coaxial with the pair of magnets 20A' and 20B' so as to cover the magnets 20A' and 20B' from their upper side.

Four columnar coil springs 46A to 46D are inserted between the upper magnet 20A' and the end plate 43b" of the objective lens holder 43" such that the axes of the coil springs 46A to 46D are parallel to the axis A. Two ends of each of the coil springs 46A to 46D are fixed at the upper magnet 20A' and the end plate 43b" of the objective lens holder 43".

The coil springs 46A to 46D serve to hold an objective lens 26 at a neutral position when the objective lens 26 is pivoted about the axis A.

Unlike in the fourth embodiment, four coils 45A to 45D are adhered to the outer surface of the coil 32 at equal angular intervals. Reference numeral 47 denotes a light window.

All other arrangements in the sixth embodiment are the same as that of the fourth embodiment, including the one wherein the coils 45A to 45D are located in the vicinity of dense magnetic flux portions b.

Figure 19:
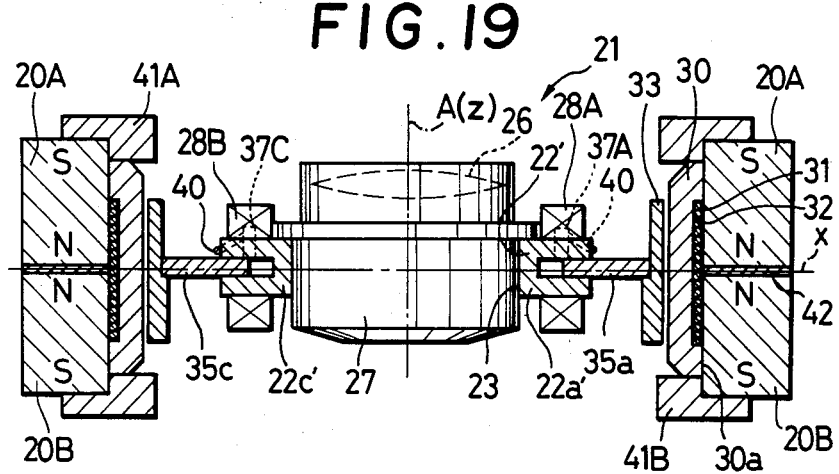
Figure 20:
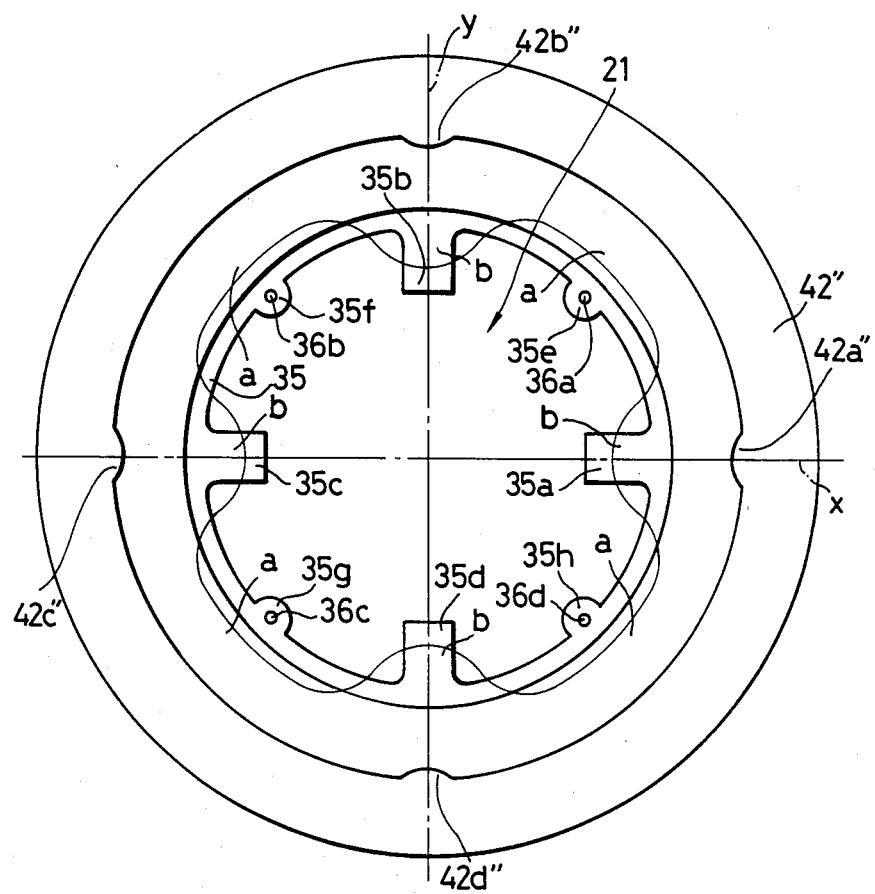

Seventh Embodiment (FIGS. 19 and 20)

The seventh embodiment is substantially the same as the second embodiment, except that a spacer 42" having substantially the same shape as the spacer 42 in each of the fourth and fifth embodiments is inserted between a pair of magnets 20A and 20B.

In the seventh embodiment, pivotal movement of a ring 35 or the like about an axis A can be easily prevented by a magnetic lock caused by attraction between supports 35a to 35d of the ring 35 magnetized by the pair of magnets 20A and 20B and dense magnetic blux portions b formed by projections 42a" to 42d" of the spacer 42".

Figure 21:
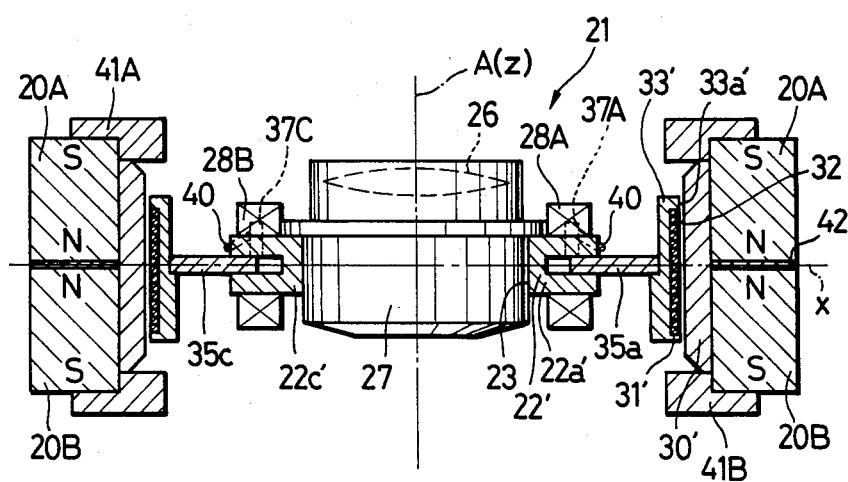

Eighth Embodiment (FIG. 21)

The eighth embodiment is substantially the same as the third embodiment, except that a spacer 42" is inserted between a pair of magnets 20A and 20B.

The pivotal movement of a ring 35 or the like about an axis A can be easily prevented by a magnetic lock in the same manner as in the seventh embodiment.

Figure 22B:
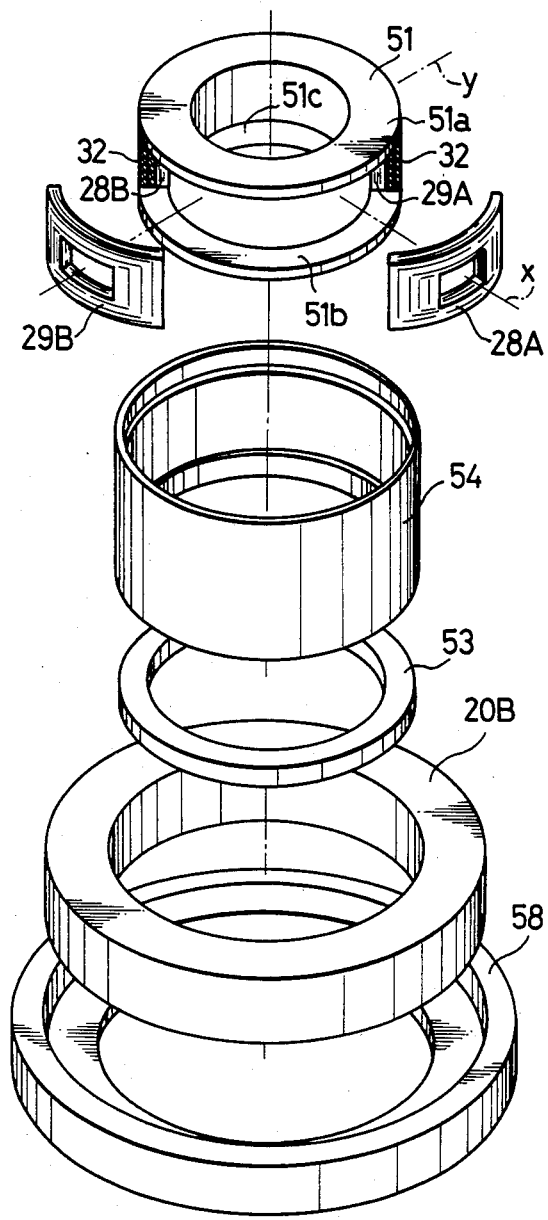
Figure 23:
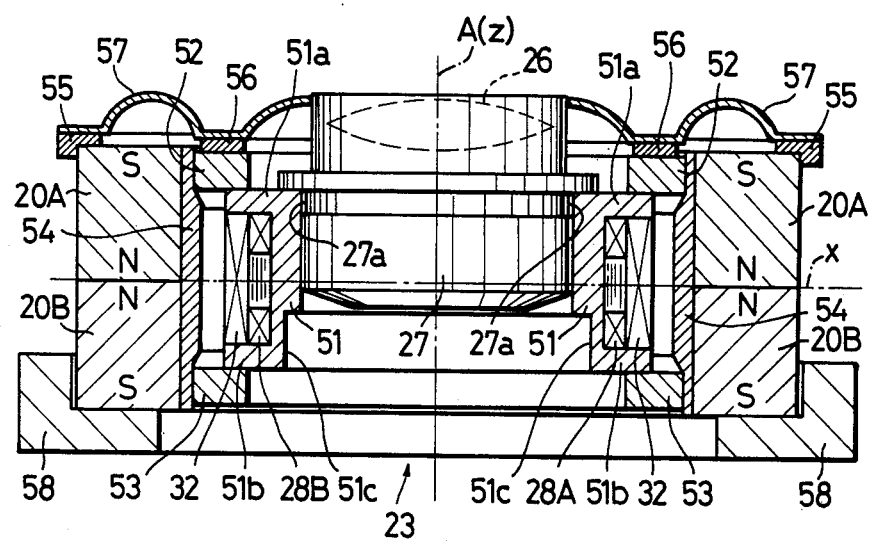

Ninth Embodiment (FIGS. 22 and 23)

In the ninth embodiment, a lens frame 27 is inserted in a bobbin 51 having flanges 51a and 51b at its two ends and is adhered to the bobbin 51. A groove 27a is formed on the outer surface of the lens frame 27. When an adhesive is applied to the outer surface of the lens frame 27, and the lens frame 27 is inserted in the bobbin 51, an excessive adhesive portion is held in the groove 27a. Therefore, excessive adhesive will not be applied between the end faces of the bobbin 51 and the lens frame 27, and the lens frame 27 can be accurately aligned along the optical axis. A step 51c is formed on the inner surface of the bobbin 51 so as to provide a wiring space.

Coils 28A, 28B, 29A and 29B are adhered to the outer surface of the bobbin 51. A coil 32 is overlayed on the coils 28A, 28B, 29A and 29B. However, the coils 28A, 28B, 29A and 29B may also be overlayed on the coil 32. More specifically, the coil 32 is wound around the outer surface of the bobbin 51 and the coils 28A, 28B, 29A and 29B is adhered to the surface of the coil 32.

The flanges 51a and 51b are respectively supported by a pair of annular stainless steel members 52 and 53 so as to slide the bobbin 51 with respect to the annular members 52 and 53. The annular members 52 and 53 are respectively adhered to inner surface portions of a stainless steel cylinder 54 in the vicinity of two ends thereof. The cylinder 54 is brought into slidable contact with the polished inner surfaces of the pair of magnets 20A and 20B.

In other words, the annular members 52 and 53 and the cylinder 54 are movable members which are moved upon movement of the bobbin 51 or the like along the axis A. These movable members are in slidable contact with bases constituted by the magnets 20A and 20B.

Annular members 55 and 56 made of a metal (e.g., aluminum) or paper are respectively adhered to the end face of the S pole of the magnet 20A and the annular member 52. A film damper 57 made of rubber or the like connects the annular members 55 and 56 with the lens frame 27. The film damper 57 covers the upper end of the sliding surface between the cylinder 54 and the magnets 20A and 20B so as to constitute an annular air chamber. The magnet 20B is mounted on a mounting base 58.

In the optical pickup according to the ninth embodiment, when a drive current flows through the coils 28A, 28B, 29B and 29B, the bobbin 51 is slid with respect to the annular members 52 and 53 so as to move an objective lens 26 in a direction perpendicular to the axis A in the same manner as in the third embodiment. When the drive current flows through the coil 32, the cylinder 54 is slid with respect to the magnets 20A and 20B to move the objective lens 26 along the axis A. In other words, the objective lens 26 can be moved along the three orthogonal axes.

In this optical pickup, the annular members 52 and 53 comprise stainless steel which is a low permeability material or a magnetic material having a low permeability. The annular members 52 and 53 are attracted to the vicinities of a magnetic field of high magnetic flux density corresponding to the S poles of the magnets 20A and 20B, respectively, thereby holding the objective lens 26 at a neutral position along the axis A. At the same time, sine the lens frame 27 is supported by the film damper 57, the objective lens 26 is held in a neutral position on a plane perpendicular to the axis A, and the objective lens 26 is prevented to pivot about the axis A.

However, even if the annular members 52 and 53 comprise a nonmagnetic material such as aluminum, the objective lens 26 can be held in the neutral position along the axis A by causing a bias current to flow through the coil 32 or by increasing the support force of the film damper 57.

In the optical pickup according to this embodiment as described above, the coil 32 as well as the coils 28A, 28B, 29A and 29B is mounted on the bobbin 51 adhered to the lens frame 27. Therefore, even if spaces are respectively formed between the flanges 51a and 51b of the bobbin 51 and the annular members 52 and 53, the bobbin 51 can be moved along the axis A in accordance with a drive current flowing through the coil 32. Therefore, a high-response optical pickup can be obtained.

In the optical pickup according to this embodiment, the inner surfaces of the magnets 20A and 20B are polished and are brought into slidable contact with the cylinder 54. Therefore, unlike in the third embodiment, the cylinder 30' for obtaining a slidable surface need not be used in addition to the magnets 20A and 20B. As a result, the magnets 20A and 20B, the coils 28A, 28B, 29A, 29 and 32 can be arranged closer to each other. Therefore, a high driving force can be obtained, and a compact, light-weight optical pickup can be obtained.

In the optical pickup according to this embodiment, the air chamber is formed by the film damper 57 which covers the upper end portion of the slidable surface between the cylinder 54 and the magnets 20A and 20B. Therefore, air flows along the sliding surface in accordance with changes in volume of the air chamber due to movement of the bobbin 51 along the axis A, thereby decreasing friction between the sliding surfaces and hence smoothly moving the bobbin 51. In addition, air flowing along the slidable surface has a Q damping effect, so that resonance of the bobbin 51 can be prevented.

The film damper 57 also has a dustproofing effect for the sliding surfaces between the flange 51a of the bobbin 51 and the annular member 52 and the sliding surfaces between the cylinder 54 and the magnets 20A and 20B.

Figure 24:
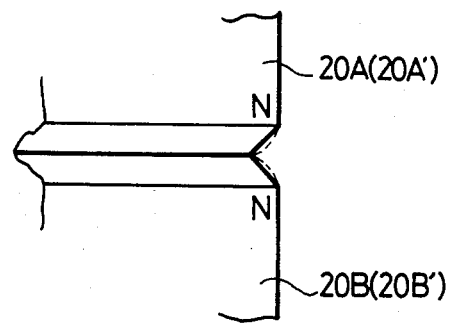
FIG. 24 is a representation of a modification of an edge of a magnet.

In each of the first to ninth embodiments of the present invention, when edges of the pair of magnets 20A and 20B or 20A' and 20B' are inclined as indicated by solid lines in FIG. 24, a magnetic field of high magnetic flux density can be obtained. The edges of the pair of magnets preferably have an arcuated shape as indicated by chain lines.

What is claimed is:

1. An optical pickup having a driving unit, comprising a pair of cylindrical or columnar magnets magnetized such that a pair of magnetic poles of each of said magnets are aligned with an axis and arranged such that the same magnetic poles in said magnets oppose each other, and coils wound in a vicinity of one of said pair of magnetic poles in predetermined directions, whereby said magnets and said coils constitute said driving unit for driving a driven member having an objective lens.

2. An optical pickup according to claim 1, wherein said coils comprise first and second coils for driving the driven member along first and second directions perpendicular to each other on a plane perpendicular to the axis.

3. An optical pickup according to claim 1, wherein said coils comprise first, second and third coils for driving the driven member along first and second directions perpendicular to each other on a plane perpendicular to the axis and along a third direction parallel to the axis.

4. An optical pickup according to any one of claims 1 to 3, wherein said pair of magnets have a cylindrical shape, a ring for supporting the driven member is arranged in a space defined by said pair of magnets and is coaxial with said pair of magnets in a vicinity of one of the pair of magnetic poles, said ring is made of a soft magnetic material and has projections in a direction substantially perpendicular to the axis, a ring-like spacer is inserted between said pair of magnets, said spacer is made of a soft magnetic material and has an irregularity substantially perpendicular to the axis along an inner peripheral edge thereof so as to constitute dense and sparse magnetic flux portions in a magnetic field, a magnetic force between the dense magnetic flux portions and said projections of said ring prevents said ring from being pivoted about the axis.

5. An optical pickup according to claim 1, wherein a spacer is inserted between said pair of magnets, said spacer is made of a soft magnetic material and has an irregularity substantially perpendicular to the axis along an inner peripheral edge thereof so as to constitute dense and sparse magnetic flux portions in a magnetic field, and said coils comprise a first coil for driving the driven member in a direction parallel to the axis and a second coil, disposed at a transition position from the dense magnetic flux portion to the sparse magnetic flux portion, for driving the driven member about the axis.

6. An optical pickup according to any of claim 1 to 3, including means for mounting said coils on said driven member.

7. An optical pickup according to any of claims 1 to 3, wherein said pair of magnets have a cylindrical shape, and including a ring for supporting the driven member arranged in a space defined by said pair of magnets and coaxial with said magnets in a vicinity of one of the pair of magnetic poles, means for mounting said coils on the driven member, said ring being made of a soft magnetic material and having projections in a direction substantially perpendicular to the axis, a ring-like spacer inserted between said pair of magnets, said spacer being made of a soft magnetic material and having an irregularity substantially perpendicular to the axis along an inner peripheral edge thereof so as to constitute dense and sparse magnetic flux portions in a magnetic field, the magnetic force between the dense magnetic flux portions and said projections of said ring preventing said ring from being pivoted about the axis.

8. An optical pickup according to any of claims 1 to 3, including mounting means for mounting said movable member in sliding contact with a base to allow sliding movement of the driven member along the axis, and including a film member formed to cover upper end portions of the sliding surfaces of said movable member and said base to form an air chamber.

9. An optical pickup according to any of claims 1 to 3, wherein said pair of magnets have a cylindrical shape, and including a ring for supporting the driven member arranged in a space defined by said pair of magnets and coaxial with said magnets in a vicinity of one of the pair of magnetic poles, said ring being made of a soft magnetic material and having projections in a direction substantially perpendicular to the axis, a ring-like spacer inserted between said pair of magnets, said spacer being made of a soft magnetic material and having an irregularity substantially perpendicular to the axis along an inner peripheral edge thereof so as to constitute dense and sparse magnetic portions in a magnetic field, the magnetic force between the dense magnetic flux portions and said projections of said ring preventing said ring from being pivoted about the axis, means for mounting said movable member in sliding contact with a base to allow sliding movement of the driven member along the axis, and a film member formed to cover upper end portions of the sliding surfaces of said movable member and said base so as to form an air chamber.

10. An optical pickup according to any of claims 1 to 3, wherein said pair of magnets have a cylinder shape, and including a ring for supporting the driven member arranged in a space defined by said pair of magnets and coaxial with said magnets in a vicinity of one of the pair of magnetic poles, means for mounting said coils on the driven member, said ring being made of a soft magnetic material and having projections in a direction substantially perpendicular to the axis, a ring-like spacer inserted between said pair of magnets, said spacer being made of a soft magnetic material and having an irregularity substantially perpendicular to the axis along an inner peripheral edge thereof so as to constitute dense and sparse magnetic portions in a magnetic field, the magnetic force between the dense magnetic flux portions and said projections of said ring preventing said ring from being pivoted about the axis, means for mounting said movable member in sliding contact with a base to allow sliding movement of the driven member along the axis, and a film member formed to cover upper end portions of the sliding surfaces of said movable member and said base so as to form an air chamber.

* * * * *